(12) United States Patent
Li et al.

(10) Patent No.: US 8,894,299 B2
(45) Date of Patent: *Nov. 25, 2014

(54) OPTICAL FIBER CLAMPING MECHANISM AND OPTICAL FIBER CONNECTOR USING THE SAME

(71) Applicants: Hong Fu Jin Precision Industry (ShenZhen) Co., Ltd., Shenzhen (CN); Hon Hai Precision Industry Co., Ltd., New Taipei (TW)

(72) Inventors: Zhi-Ming Li, Shenzhen (CN); Le-Peng Wei, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/792,229

(22) Filed: Mar. 11, 2013

(65) Prior Publication Data

US 2013/0266269 A1    Oct. 10, 2013

(30) Foreign Application Priority Data

Apr. 9, 2012    (CN) .......................... 2012 1 0100960

(51) Int. Cl.
*G02B 6/36*    (2006.01)
*G02B 6/38*    (2006.01)

(52) U.S. Cl.
CPC ............ *G02B 6/3624* (2013.01); *G02B 6/3805* (2013.01); *G02B 6/387* (2013.01); *G02B 6/3862* (2013.01); *G02B 6/3879* (2013.01); *G02B 6/3875* (2013.01)

USPC .................. 385/81; 385/56; 385/62; 385/65; 385/83; 385/87

(58) Field of Classification Search
CPC .... G02B 6/3805; G02B 6/3862; G02B 6/387; G02B 6/3875
USPC .............................. 385/56, 62, 65, 81, 83, 87
See application file for complete search history.

(56) References Cited

U.S. PATENT DOCUMENTS 4,787,704 A * 11/1988 Knecht et al. .................. 385/64
4,889,405 A * 12/1989 Walker et al. .................. 385/55
(Continued)

FOREIGN PATENT DOCUMENTS

JP            10-123339        5/1998
JP         2001-249251 A      9/2001
(Continued)

*Primary Examiner* — Charlie Peng
(74) *Attorney, Agent, or Firm* — Novak Druce Connolly Bove + Quigg LLP (57) ABSTRACT

A fixing module for gripping an optical fiber includes a support member, a fastening member, and a locking member. The support member includes a fixing portion defining a receiving portion. The fastening member comprises a first resisting portion and a second resisting portion slantingly connected with the first resisting portion. The first resisting portion comprises a first resisting surface facing the bottom of the receiving portion. The second resisting portion comprises a second resisting surface facing the bottom of the receiving portion. The fastening member is received in the receiving portion, and the locking member sleeved on the fixing portion. The first resisting surface and the second resisting surface resist the bottom of the receiving portion in turn as the locking member slides along the fixing portion.

16 Claims, 11 Drawing Sheets

(56) References Cited

U.S. PATENT DOCUMENTS

| | | | |
|---|---|---|---|
| 6,464,408 B1* | 10/2002 | Nolan | 385/87 |
| 6,554,487 B2* | 4/2003 | Nolan | 385/78 |
| 7,775,726 B2* | 8/2010 | Pepin et al. | 385/78 |
| 8,579,517 B2* | 11/2013 | Hsu | 385/74 |
| 8,632,259 B2* | 1/2014 | Shen et al. | 385/81 |
| 2002/0191919 A1* | 12/2002 | Nolan | 385/78 |
| 2008/0226236 A1* | 9/2008 | Pepin et al. | 385/81 |
| 2013/0266266 A1* | 10/2013 | Li et al. | 385/78 |
| 2013/0266267 A1* | 10/2013 | Li et al. | 385/78 |
| 2013/0266272 A1* | 10/2013 | Li et al. | 385/83 |
| 2013/0266276 A1* | 10/2013 | Li et al. | 385/92 |

FOREIGN PATENT DOCUMENTS

| | | |
|---|---|---|
| JP | 2002-72011 A | 3/2002 |
| JP | 2005-107309 | 4/2005 |
| JP | 2009-192908 | 8/2009 |
| JP | 2012-37624 | 2/2012 |
| JP | 2013-218335 | 10/2013 |

* cited by examiner

OPTICAL FIBER CLAMPING MECHANISM AND OPTICAL FIBER CONNECTOR USING THE SAME

CROSS-REFERENCE TO RELATED APPLICATIONS

This application claims all benefits accruing under 35 U.S.C. §119 from China Patent Application No. 201210100960.6, filed on Apr. 9, 2012, in the China Intellectual Property Office, the disclosure of which is incorporated herein by reference. The application is also related to co-pending applications entitled, "OPTICAL FIBER CONNECTOR AND ASSEMBLING DEVICE FOR THE SAME" Ser. No. 13/792,215; "FIBER END SURFACE MACHINING DEVICE AND FIBER POSITION STRUCTURE THEREOF" Ser. No. 13/792,218; "FIBER MACHINING DEVICE AND ASSEMBLING METHOD FOR OPTICAL FIBER CONNECTOR" Ser. No. 13/792,219; "OPTICAL FIBER CONNECTOR" Ser. No. 13/792,221; "OPTICAL FIBER CONNECTOR" Ser. No. 13/792,222; "OPTICAL FIBER CONNECTOR" Ser. No. 13/792,223.

BACKGROUND

1. Technical Field

The present disclosure relates to optical fiber clamping mechanisms, particularly to an optical fiber connector using the optical fiber clamping mechanism.

2. Description of the Related Art

In the Fiber To The Home (FTTH) field, many optical fiber connectors are needed for connecting the optical fiber. An optical fiber connector generally includes an optical ferrule with an optical fiber stub already terminated in the optical ferrule, an optical fiber holder, and a clamp sleeve sleeved on the optical fiber holder to fasten an optical fiber. To improve the quality of optical coupling and minimize Fresnel losses of the optical fiber connector, there are two manners of securing a joint between the optical fiber stub and the optical fiber. In a first manner, a matching liquid is injected in the optical fiber holder. However, the matching liquid evaporates easily. In a second manner, the optical fiber stub and the optical fiber are joined together by melting them together. However, the second manner is not convenient or precise enough to join the optical fiber stub and the optical fiber together.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
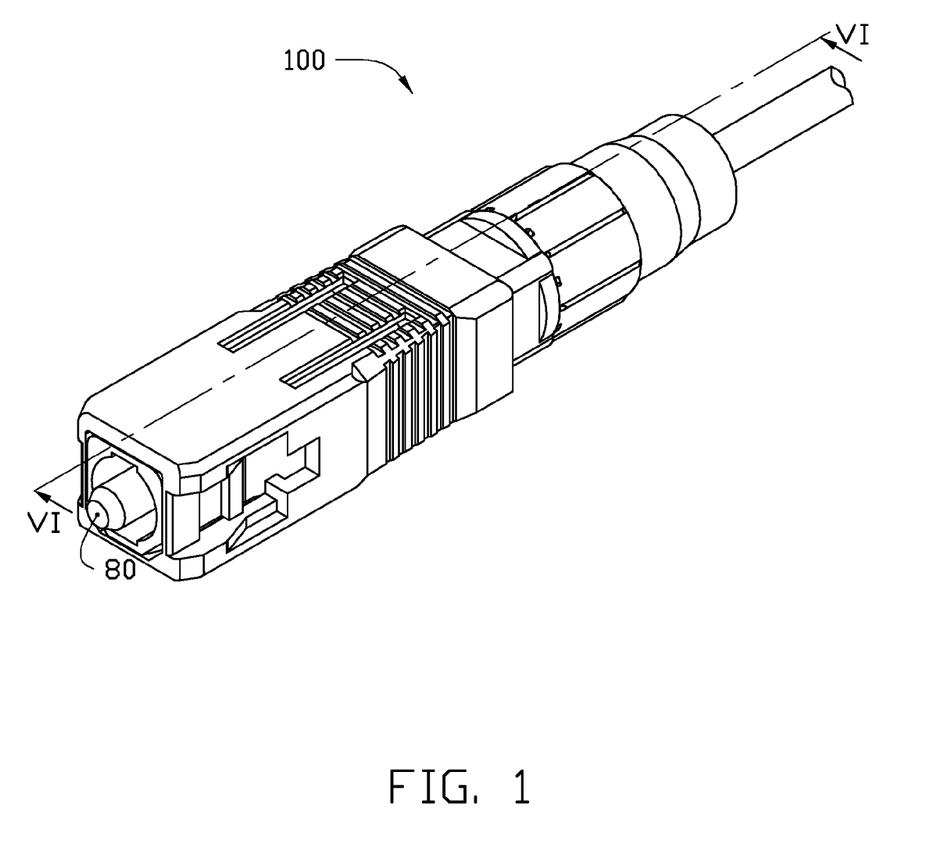
FIG. 1 is an isometric, assembled view of an embodiment of an optical fiber connector.
Figure 2:
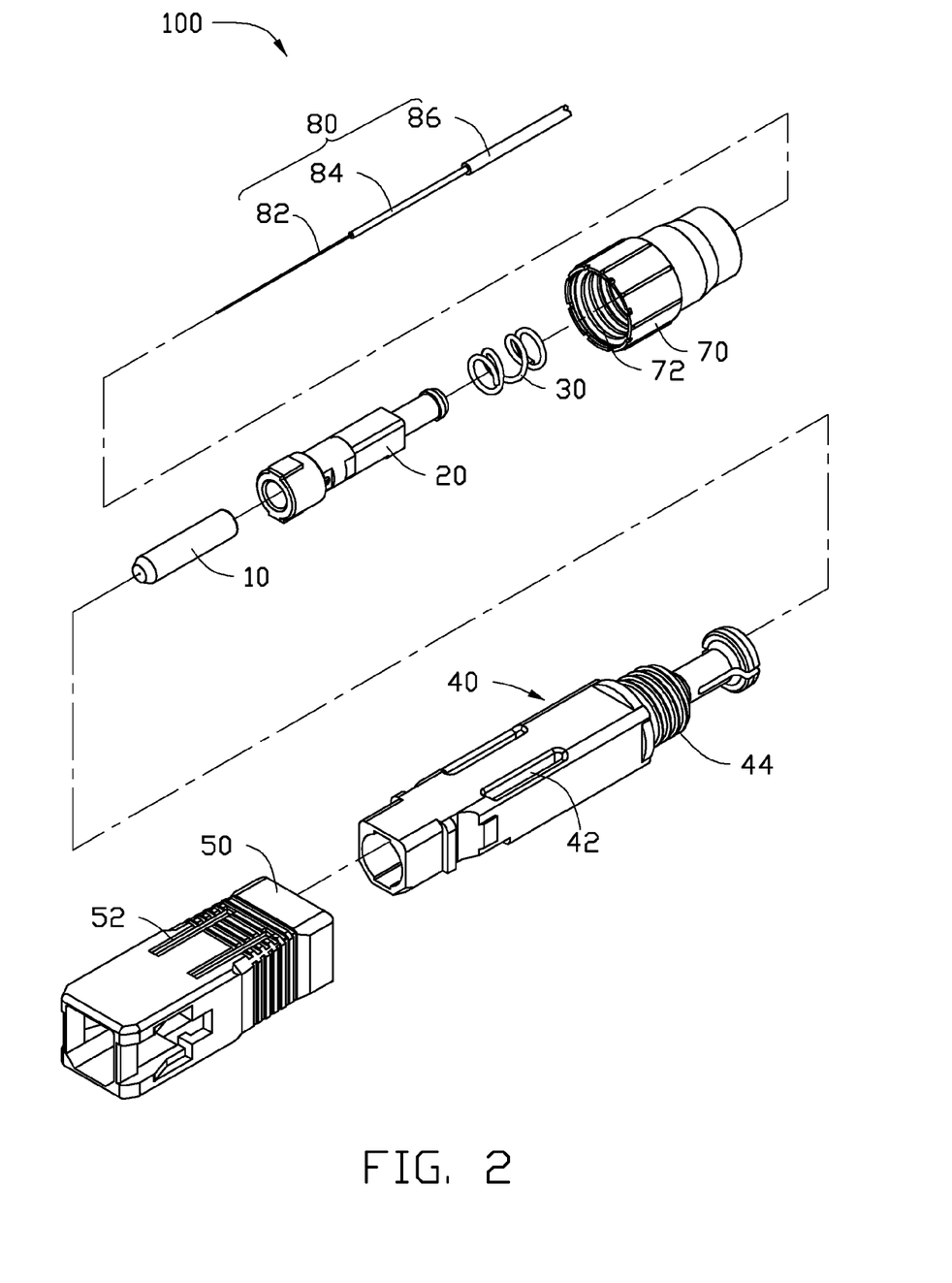
FIG. 2 is an exploded, isometric view of the optical fiber connector of FIG. 1 including a fixing module.

FIGS. 1 and 2 show an embodiment of an optical fiber connector 100. The optical fiber connector 100 includes an optical fiber ferrule 10, a fixing module 20, an elastic member 30, an inner housing 40, an outer housing 50, and a boot 70. The optical fiber ferrule 10 is positioned on one end of the fixing module 20. The elastic member 30 is sleeved on the other end of the fixing module 20 away from the optical fiber ferrule 10. The inner housing 40 is sleeved on the fixing module 20. The outer housing 50 is sleeved on the inner housing 40. The boot 70 is sleeved on an end of the inner housing 40 away from the outer housing 50. In an illustrated embodiment, the optical fiber connector 100 is a Subscriber Connector (SC) optical fiber connector. The optical fiber connector 100 grips a cable 80. The cable 80 includes an optical fiber 82, an inner coating 84 formed on the optical fiber 82, and an outer coating 86 formed on the inner coating 84. To facilitate the gripping of the cable 80 in the optical fiber connector 100, part of the outer coating 86 and the inner coating 84 are removed to expose the optical fiber 82.

Figure 3:
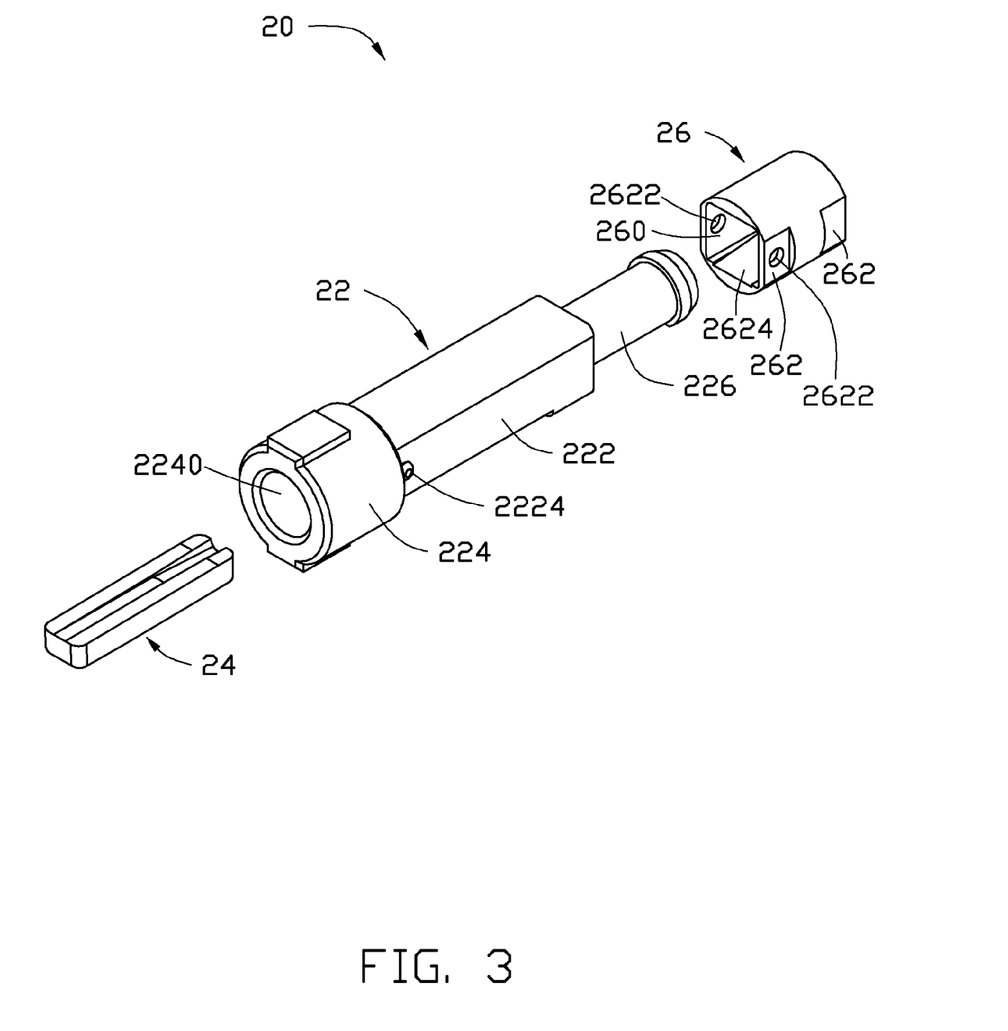
FIG. 3 is an exploded, isometric view of the fixing module of FIG. 2 including a fastening member.

Referring to FIGS. 2 and 3, the optical fiber ferrule 10 is substantially cylindrical, and is made of ceramic materials. The optical fiber ferrule 10 axially defines a through hole 102 (see FIG. 6) to receive the optical fiber 82. The optical ferrule 10 further defines a guiding hole 104 (see FIG. 6) communicating with the through hole 102 in an end of the optical ferrule 10 to facilitate the insertion of the optical fiber 82 into the through hole 102. In the illustrated embodiment, a diameter of the through hole 102 is slightly larger than a diameter of the optical fiber 82, to facilitate passing the optical fiber 82 through. When an end of the optical fiber 82 encounters resistance, the optical fiber 82 can be elastically bent in the through hole 102, which holds the optical fiber 82 in place. The guiding hole 104 can be substantially funnel shaped with a smaller end of the guiding hole 104 communicating with the through hole 102, which prevents the optical fiber 82 from breaking when being bent at a distal end of the through hole 102.

Figure 4:
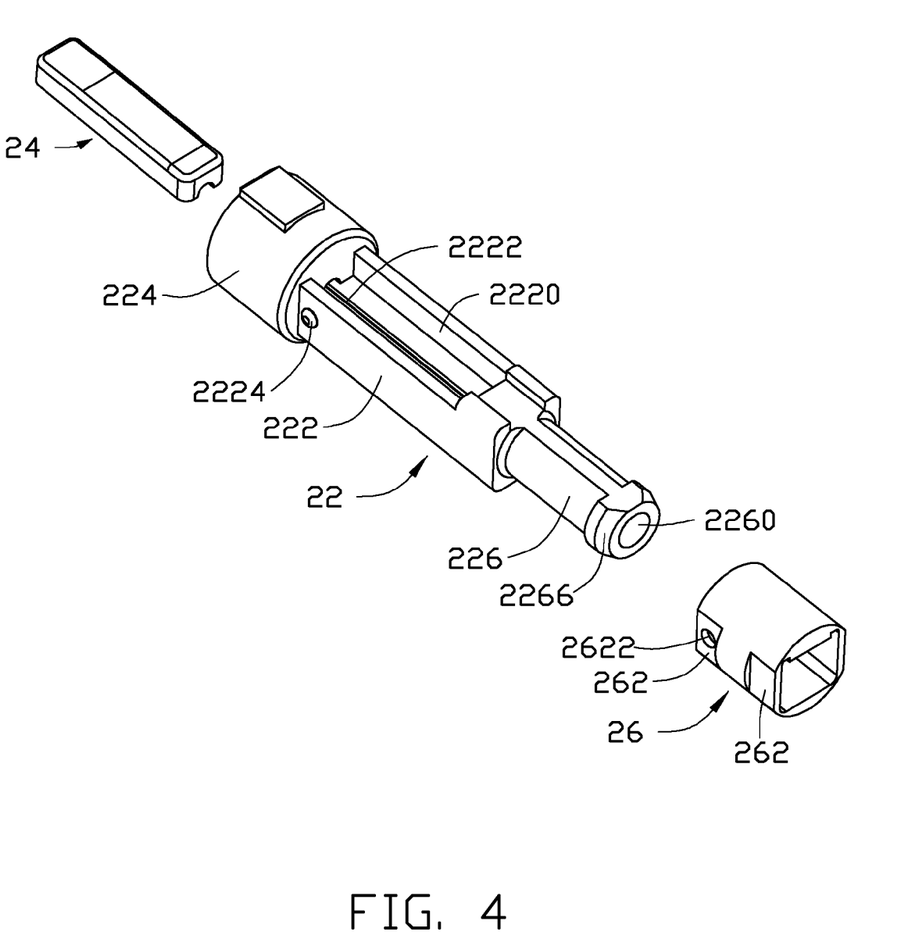
FIG. 4 is similar to FIG. 3, but viewed from another aspect.
Figure 5:
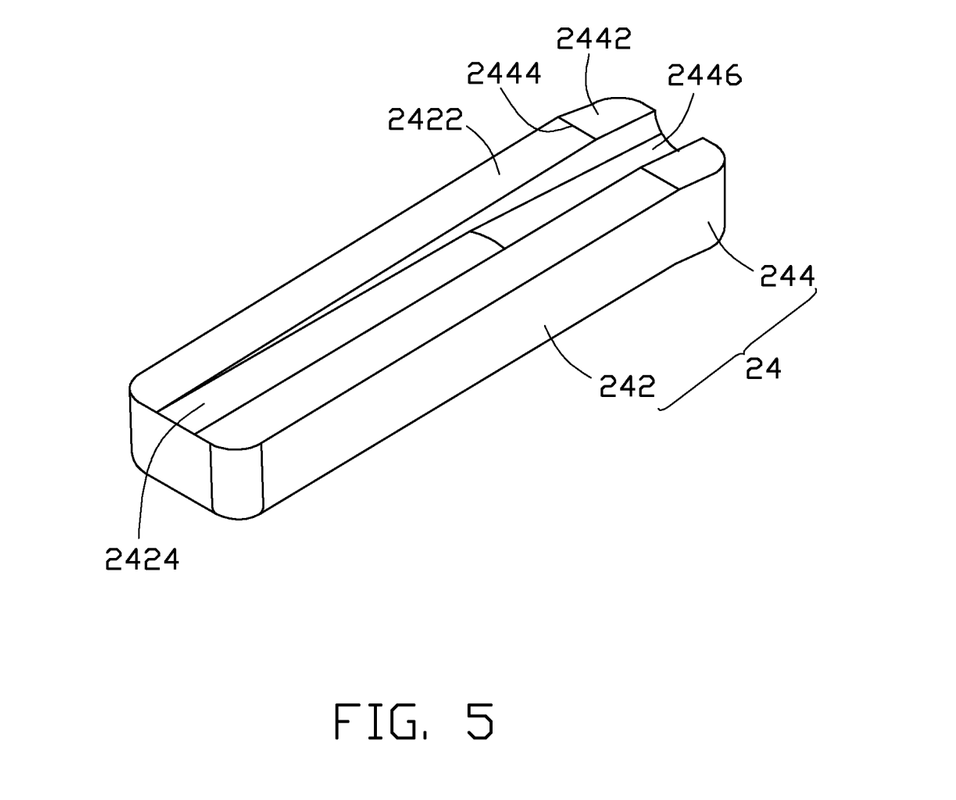
FIG. 5 is an enlarged, isometric view of the fastening member of FIG. 3.

FIGS. 3 to 5 show an embodiment of a fixing module 20. The fixing module 20 is a sleeve. The fixing module 20 includes a support member 22, a fastening member 24 mating with the support member 22, and a locking member 26. The locking member 26 is sleeved on the support member 22 and the fastening member 24 to grip the optical fiber 82.

The support member 22 is substantially cylindrical. The support member 22 includes a fixing portion 222, a first assembling portion 224, and a second assembling portion 226. The first assembling portion 224 and the second assembling portion 226 extend outward from opposite ends of the fixing portion 222. The second assembling portion 226 forms a latching portion 2266 protruding from the outer surface of the assembling portion 226 adjacent to an end of the second assembling portion 226 away from the fixing portion 222.

Figure 6:
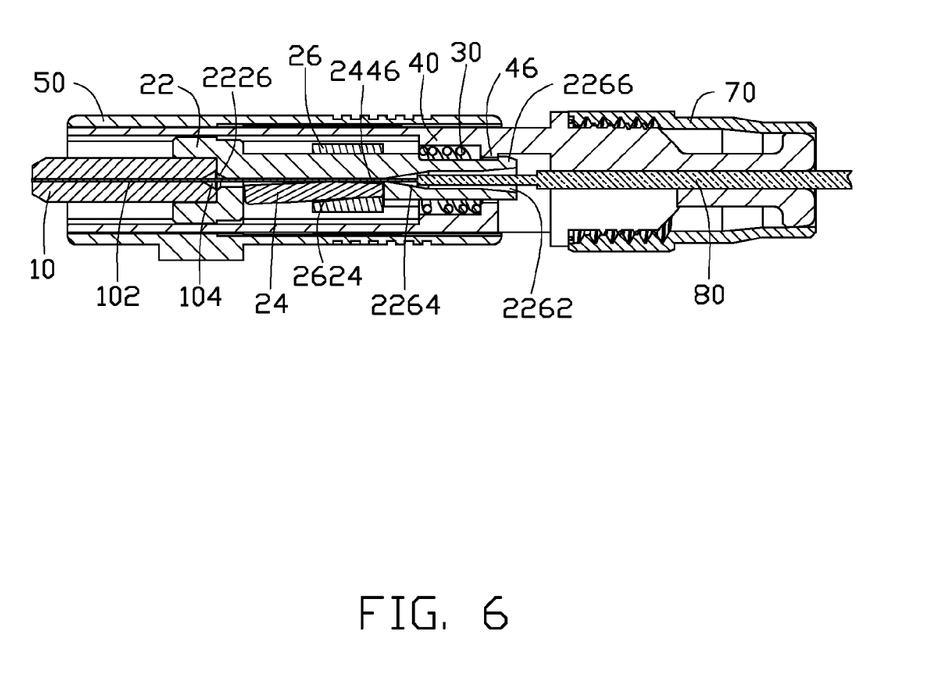
FIG. 6 is a cross-sectional view of the optical fiber connector of FIG. 1 taken along the line VI-VI, showing the fixing module at an ungripping state.

In the illustrated embodiment, a cross section of the fixing portion 222 is rectangular, and the fixing portion 222 defines a receiving portion 2220 for receiving the fastening member 24. The fixing portion 222 further defines a first restricting groove 2222 in the bottom of the receiving portion 2220 extending in a direction substantially parallel to an optical axis of the optical fiber connector 100. The first restricting groove 2222 is a V-shaped groove. The first restricting groove 2222 can also be a U-shaped groove. The fixing portion 222 forms a pair of protrusions 2224 protruding from opposite sides of the fixing portion 222 adjacent to the first assembling portion 224. The protrusions 2224 are located at opposite sides of the receiving portion 2220. The first assembling portion 224 axially defines an assembling hole 2240 communicating with the first restricting groove 2222. The second assembling portion 226 axially defines a receiving hole 2260 communicating with the first restricting groove 2222. Both a diameter of the assembling hole 2240 and a diameter of the receiving hole 2260 are larger than a width of the restricting groove 2222. Referring to FIG. 6, a guiding groove 2226 is defined in an inner surface of the first restricting groove 2222 adjacent to the assembling hole 2240. The receiving hole 2260 is stepped. The receiving hole 2260 includes a first guiding hole 2262 at an end thereof away from the first restricting groove 2222 and a second guiding hole 2264 adjacent to and communicating with the first restricting groove 2222. A diameter of the second guiding hole 2264 is less than a diameter of the first guiding hole 2262.

The fastening member 24 is received in the receiving portion 2220 of the supporting member 22, and mates with the supporting member 22 so as to fasten the optical fiber 82 of the cable 80. The fastening member 24 includes a first resisting portion 242 and a second resisting portion 244 slantingly connected with the first resisting portion 242. The first resisting portion 242 includes a first resisting surface 2422 facing the bottom of the receiving portion 2220. The second resisting portion 244 includes a second resisting surface 2442 facing the bottom of the receiving portion 2220. When the locking member 26 slides along the fixing portion 222, the first resisting surface 2422 and the second resisting surface 2442 resist the bottom of the receiving portion 2220 in turn. The first resisting surface 2422 defines a second restricting groove 2424 corresponding to the first restricting groove 2222. The second resisting surface 2442 defines a guiding groove 2446 communicating with the second restricting groove 2424. The bottom of the guiding groove 2446 is a slanted surface, the guiding groove 2446 is deeper than the second restricting groove 2424, and the depth of the guiding groove 2446 gradually increases from the end adjacent to the second restricting groove 2424 to the other end. In the illustrated embodiment, the first resisting surface 2422 and the second resisting surface 2442 are both flat surfaces intersecting at an adjoining line 2444. In alternative embodiments, the surface between the first resisting surface 2422 and the second resisting surface 2442 can have a smooth curve.

In an alternative embodiment, the second resisting surface 2424 can be omitted, and the optical fiber 82 can be fixed in the fixing module 20 by means of the first resisting surface 2422 resisting the optical fiber 82.

In an alternative embodiment, the guiding groove 2446 is formed at an end of the receiving portion 2220 adjacent to the second resisting surface 2442.

The locking member 26 is substantially a sleeve. The locking member 26 axially defines a through hole 260 mating with a cross section of the fixing portion 222 of the support member 22. The locking member 26 forms two pairs of gripping portions 262 at outer surfaces of the locking member 26. One pair of the gripping portions 262 defines a pair of locking holes 2622 corresponding to the pair of protrusions 2224. A slanted surface 2624 is formed at an inner surface of the locking member 26 adjacent to an end of the locking member 26, the slanted surface 2624 is formed between the pair of locking holes 2622, and a diameter of the through hole 260 adjacent to the second assembling portion 226 is larger than a diameter of the through hole 260 away from the second assembling portion 226.

The elastic member 30 is a compression spring sleeved on the second assembling portion 226 in the embodiment. The inner housing 40 defines a pair of sliding grooves 42 in a sidewall thereof extending in a direction substantially parallel to the optical axis of the optical fiber connector 100. The inner housing 40 has an external thread 44 at an end thereof. The inner housing 40 further forms a locking portion 46 at an inner surface thereof corresponding to the latching portion 2266.

The outer housing 50 is shaped to facilitate the installation of the optical fiber connector 100 into an SC adapter (not shown) in the embodiment. In an alternative embodiment, the outer housing 50 can be shaped to facilitate the installation of the optical fiber connector 100 into other types of adapters. The outer housing 50 defines a pair of operating grooves 52 communicating with the pair of sliding grooves 42 of the inner housing 40. The boot 70 has an internal thread 72 corresponding to the external thread 44 of the inner housing 40. The boot 70 fastens on an end of the inner housing 40 over the external thread 44.

Figure 7:
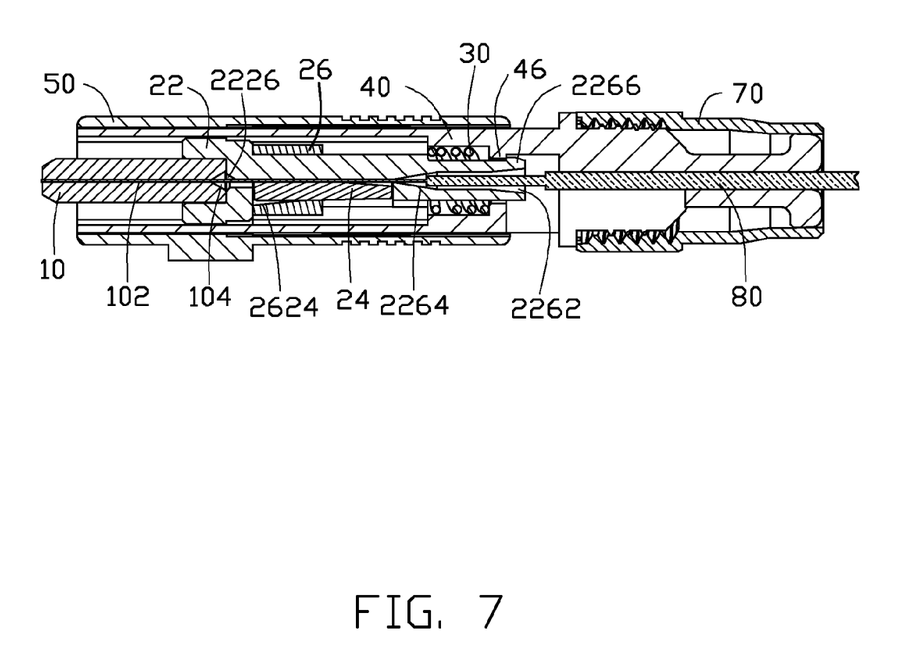
FIG. 7 is similar to FIG. 6, but showing the fixing module at a gripping state.

Referring to FIGS. 6 and 7, in assembly of the optical fiber connector 100, the fastening member 24 is received in the receiving portion 2220 of the support member 22. The locking member 26 is sleeved on an end of the support member 22 adjacent to the second assembling portion 226 (as seen in FIG. 6). The optical ferrule 10 is fastened in the assembling hole 2240 of the fixing module 20. The elastic member 30 is sleeved on the second assembling portion 226. The fixing module 20 is assembled in the inner housing 40 with the latching portion 2266 engaging with the locking portion 46. One end of the elastic member 30 resists the locking portion 46, and the other end of the elastic member 30 resists a distal end of the fixing portion 222. The outer housing 50 is sleeved on the inner housing 40 with the pair of operating grooves 52 communicating with the pair of sliding grooves 42. Finally, the boot 70 is fastened on a distal end of the inner housing 40 away from the outer housing 50.

Referring to FIGS. 1 to 7, in use of the optical fiber connector 100, the boot 70 is taken off from the inner housing 40, and the optical fiber 82 of the cable 80 is inserted into the fixing module 20 from a distal end of the boot 70 away from the outer housing 50. In an initial state, the locking member 26 is located at an end of the fixing portion 222 adjacent to the second assembling portion 226, the second resisting surface 2442 resists against the bottom of the receiving portion 2220, and the first resisting surface 2422 is distorted to form a gap (as seen in FIG. 6) between the first resisting surface 2422 and the bottom of the receiving portion 2220. The optical fiber 82 is inserted into the fixing module 20, and a length of the optical fiber 82 protruding out of the optical ferrule 10 is controlled to be in a range from about 2 μm to 4 μm. In the illustrated embodiment, the length of the optical fiber 82 protruding out of the optical ferrule 10 is 3 μm.

Figure 8:
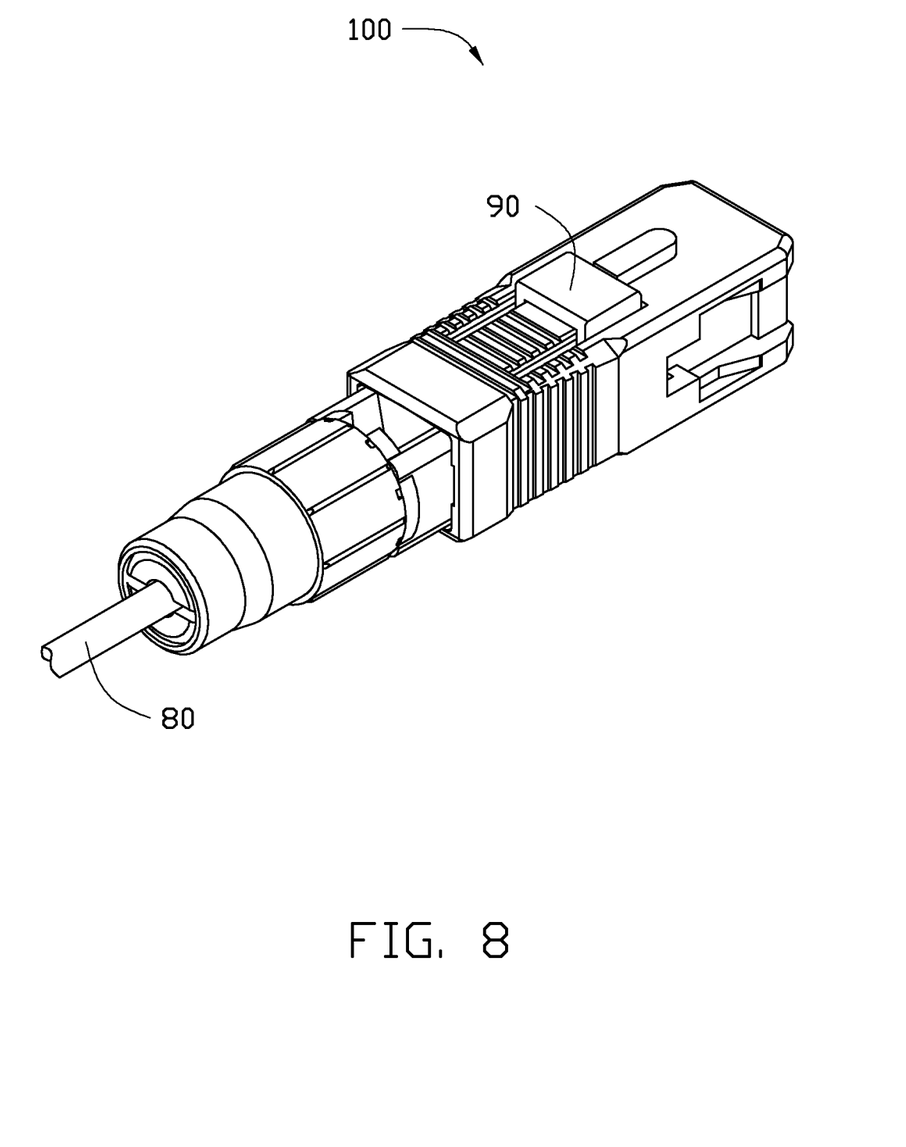
FIG. 8 is an assembled, isometric view of the optical fiber connector of FIG. 1 being clamped by an assembly tool.
Figure 9:
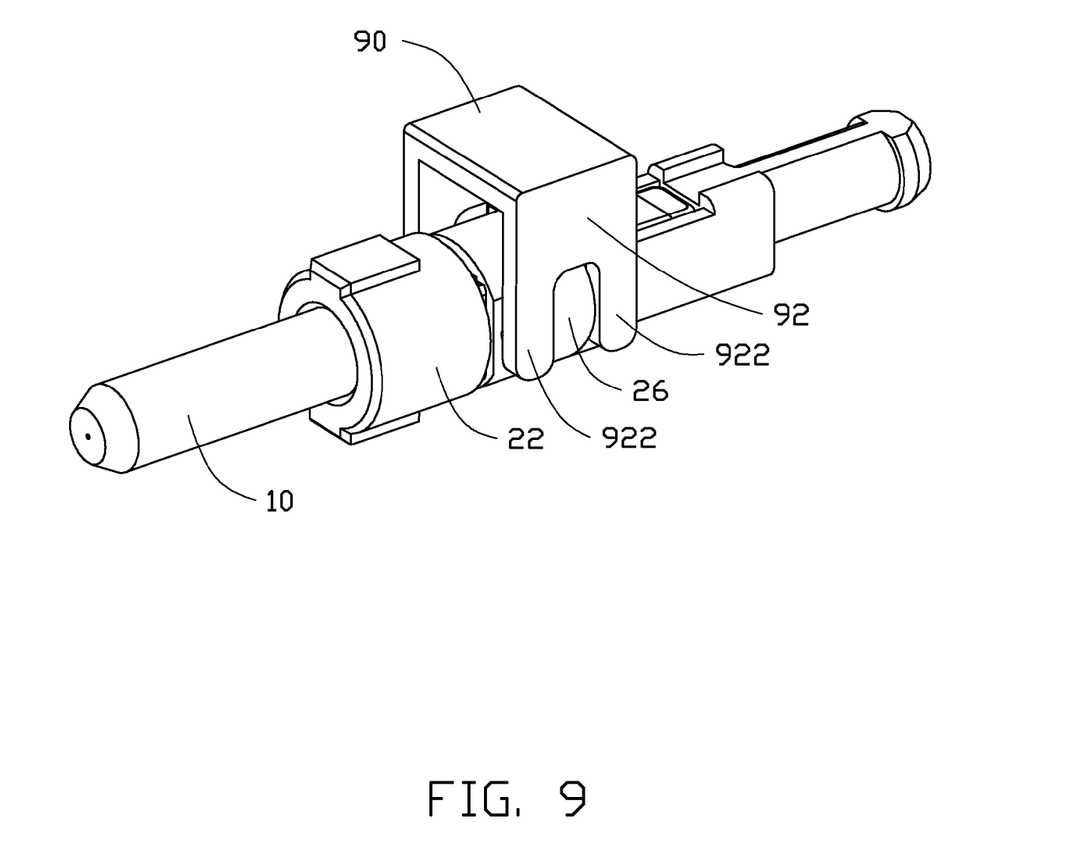
FIG. 9 is an isometric view of the fixing module of FIG. 2 being clamped by an assembly tool.

In order to slide the locking member 26, an assembling tool 90, as shown in FIGS. 8 and 9, is needed. The assembling tool 90 is substantially U-shaped and includes a pair of elastic arms 92. Each of the pair of elastic arms 92 includes a pair of elastic portions 922. In use, the pair of elastic arms 92 are passed through the pair of operating grooves 52 and the pair of sliding grooves 42 successively, and the elastic arms 92 latch with the two pairs of gripping portions 262. An operator slides the assembling tool 90 along the pair of operating grooves 52 to slide the locking member 26 towards an end of the fixing portion 222 adjacent to the first assembling portion 224, until the pair of locking holes 2622 engage with the pair of protrusions 2224. The first resisting surface 2422 resists the bottom of the receiving portion 2220 to fix the optical fiber 82 received in the first restricting groove 2222 in place. The boot 70 is fastened on a distal end of the inner housing 40 to fasten on and secure the outer coating 86 of the cable 80.

The pair of locking holes 2622 engaging with the pair of protrusions 2224 prevents the locking member 26 from sliding. In an alternative embodiment, the pair of locking holes 2622 and the pair of protrusions 2224 can be omitted.

When the optical fiber 82 needs to be removed from the optical fiber connector 100, the locking member 26 is slid via the assembling tool 90 to its initial state and the boot 70 taken off. The assembling tool 90 should be taken off the optical fiber connector 100 when the optical fiber connector 100 is in a state of use, but the locking member 26 cannot be slid along the fixing module 20 without the assembling tool 90, which prevents the optical connector 100 from being knocked off by accident, and ensures the optical fiber is always firmly fixed in the fixing module 20.

Figure 10:
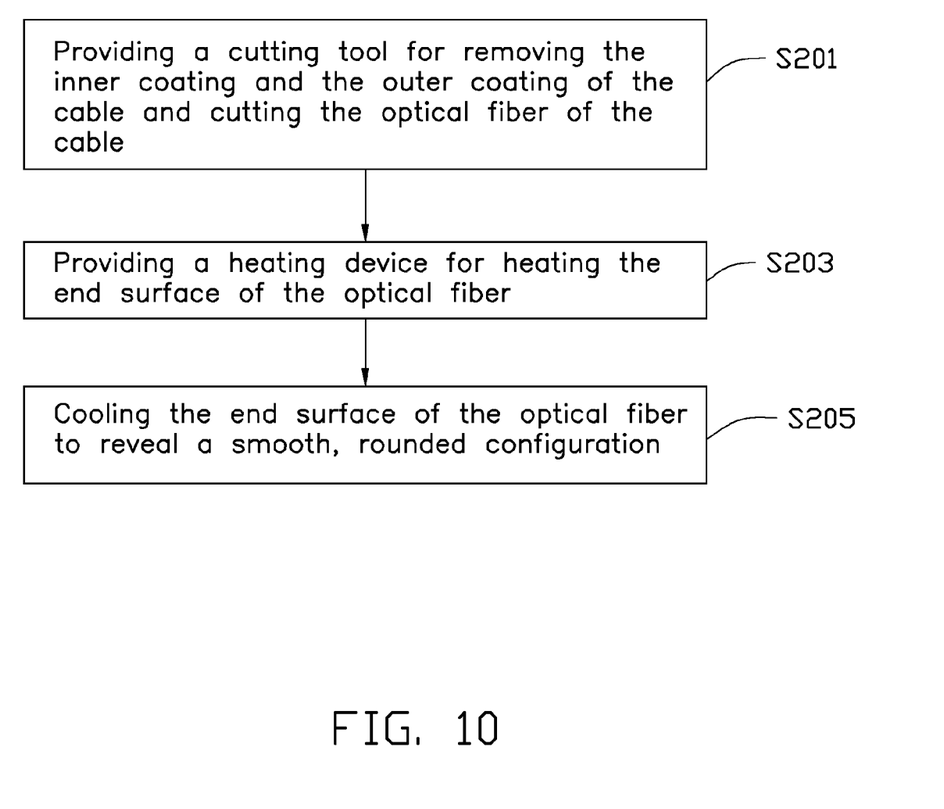
FIG. 10 is a flowchart of one embodiment of a method for treating an end surface of the optical fiber of a cable.

The optical fiber 82 can have a plurality of depressions, of cracks, of burrs, or of scratches at an end surface of the optical fiber 82 which has been cut, and any of these defects will increase a light loss and affect the efficiency of data transmission of the optical connector 100. To increase the efficiency of the data transmission of the optical connector 100, FIG. 10 shows an embodiment of a method for treating the end surface of the optical fiber 82.

In step S201, a cutting tool is provided for removing the inner coating 84 and the outer coating 86 of the cable 80 and cutting the optical fiber 82 of the cable 80. In the illustrated embodiment, the inner coating 84 and the outer coating 86 are partially removed via the cutting tool to expose the optical fiber 82.

In step S203, a heating device is provided for heating the end surface of the optical fiber 82. In the illustrated embodiment, the heating device includes two electrodes. A high pressure electric arc will be generated between the two electrodes under a discharge voltage, to heat the end surface to an elevated temperature near the melting point of the fiber material. When all defects have disappeared or have been smoothed, the heating is stopped.

In step S205, the end surface of the optical fiber 82 cools to reveal a smooth, rounded configuration.

Figure 11:
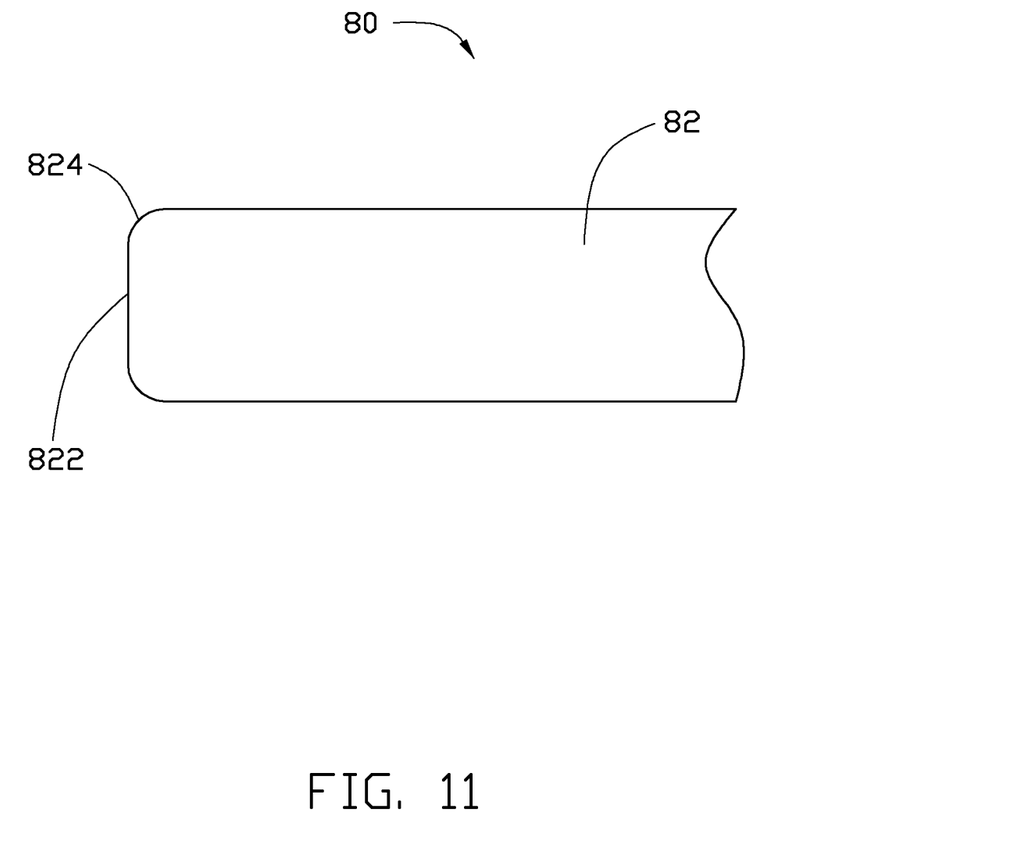
FIG. 11 is a partly enlarged view of the optical fiber of FIG. 2.

FIG. 11 shows an end surface of the optical fiber 82 after being treated by this method. The end surface of the optical fiber 82 includes a flat surface 822 at a center of the end surface and a rounded shoulder (arc surface 824) surrounding the flat surface 822.

In an alternative embodiment, the configuration of the end surface of the optical fiber 82 can be changed according to the discharge voltage or discharge time to assume a different configuration such as a mushroom profile, a spherical profile, or the like.

The optical fiber 82 is passed through the optical fiber connector 100 from a distal end of the boot 70 to a distal end of the optical ferrule 10 away from the boot 70, and the end surface of the optical fiber 82 protrudes out of a distal end of the optical ferrule 10. The optical connector 100 is different from an installable connector with an optical fiber stub already terminated in the optical ferrule. The optical connector 100 avoids the need to join segments, which improves the quality of optical coupling and minimizes Fresnel losses.

The end surface of the optical fiber 82 is smoothed by the method, which increases the contact area between the optical fiber 82 and another optical fiber abutting the optical fiber 82. A length of the optical fiber 82 out of the optical ferrule 10 is controlled to be in a range from about 2 μm to 4 μm, and when the optical connector 100 is assembled on an adapter (not shown) to be joined with another optical fiber connector (not shown), the end surface of the optical fiber 82 of the optical fiber connector 100 resists the end surface of the optical fiber of the other optical fiber connector, and the optical fiber 82 will be bent, which puts the two end surfaces in continuous contact with each other. In addition, the end surface of the optical fiber 82 will be enlarged after the end surface of the optical fiber 82 has been treated, and the diameter of the end surface of the optical fiber 82 is nearly the same as the diameter of the through hole 102. Abutting the end surface of the optical fiber of the other optical fiber connector, the end surface of the optical fiber 82 will be firmly received in the through hole 102 of the optical ferrule 10.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A fixing module for gripping an optical fiber, comprising:
   a support member comprising a fixing portion, the fixing portion defining a receiving portion;
   a fastening member received in the receiving portion, the fastening member comprising a first resisting portion and a second resisting portion slantingly connected with the first resisting portion; and
   a locking member sleeved on the fixing portion, wherein the first resisting portion comprises a first resisting surface facing the bottom of the receiving portion, the second resisting portion comprises a second resisting surface facing the bottom of the receiving portion, and the first resisting surface and the second resisting surface resists the bottom of the receiving portion in turn as the locking member slides along the fixing portion.

2. The fixing module of claim 1, wherein the fixing portion defines a first restricting groove in the bottom of the receiving portion extending in a direction substantially parallel to an optical axis of the optical fiber connector.

3. The fixing module of claim 2, wherein the support member further comprises a first assembling portion and a second assembling portion extending from opposite ends of the fixing portion, the first assembling portion axially defines an assembling hole communicating with the first restricting groove, the second assembling portion axially defines a receiving hole communicating with the first restricting groove, and both a diameter of the assembling hole and a diameter of the receiving hole are larger than a width of the restricting groove.

4. The fixing module of claim 2, wherein the first resisting surface defines a second restricting groove corresponding to the first restricting groove, the second resisting surface defines a guiding groove communicating with the second restricting groove, the bottom of the guiding groove is a slanted surface, the guiding groove is deeper than the second restricting groove, and the depth of the guiding groove is gradually deeper from one end of the guiding groove adjacent to the second restricting groove to the other end of the guiding groove away from the second restricting groove.

5. The fixing module of claim 4, wherein the locking member axially defines a through hole mating with the cross section of the fixing portion of the support member.

6. The fixing module of claim 5, wherein the locking member forms two pairs of gripping portions at the outer surface of the locking member.

7. The fixing module of claim 6, wherein the fixing portion forms a pair of protrusions protruding out from opposite sides of the fixing portion adjacent to the first assembling portion, and one pair of the gripping portions define a pair of locking holes for engaging with the pair of protrusions.

8. The fixing module of claim 7, wherein the locking member further comprises a slanted surface formed at an inner surface of the locking member adjacent to an end of the locking member, the slanted surface is located between the pair of locking holes, and the diameter of the through hole adjacent to the second assembling portion is larger than the diameter of the through hole away from the second assembling portion.

9. An optical fiber connector, comprising:
a fixing module for gripping an optical fiber, the fixing module comprising a support member comprising a fixing portion, the fixing portion defining a receiving portion;
a fastening member received in the receiving portion, the fastening member comprising a first resisting portion and a second resisting portion slantingly connected with the first resisting portion; and
a locking member sleeved on the fixing portion, wherein the first resisting portion comprises a first resisting surface facing the bottom of the receiving portion, the second resisting portion comprises a second resisting surface facing the bottom of the receiving portion, and the first resisting surface and the second resisting surface resists the bottom of the receiving portion as the locking member slides along the fixing portion.

10. The fixing module of claim 9, wherein the fixing portion defines a first restricting groove in the bottom of the receiving portion extending in a direction substantially parallel to an optical axis of the optical fiber connector.

11. The fixing module of claim 10, wherein the support member further comprises a first assembling portion and a second assembling portion extending from opposite ends of the fixing portion, the first assembling portion axially defines an assembling hole communicating with the first restricting groove, the second assembling portion axially defines a receiving hole communicating with the first restricting groove, and both a diameter of the assembling hole and a diameter of the receiving hole are larger than the width of the restricting groove.

12. The fixing module of claim 10, wherein the first resisting surface defines a second restricting groove corresponding to the first restricting groove, the second resisting surface defines a guiding groove communicating with the second restricting groove, the bottom of the guiding groove is a slanted surface, the guiding groove is deeper than the second restricting groove, and the depth of the guiding groove is gradually deeper from one end of the guiding groove adjacent to the second restricting groove to the other end of the guiding groove away from the second restricting groove.

13. The fixing module of claim 12, wherein the locking member axially defines a through hole mating with the cross section of the fixing portion of the support member.

14. The fixing module of claim 13, wherein the locking member forms two pairs of gripping portions at the outer surface of the locking member.

15. The fixing module of claim 14, wherein the fixing portion forms a pair of protrusions protruding out from opposite sides of the fixing portion adjacent to the first assembling portion, and one pair of the gripping portions define a pair of locking holes for engaging with the pair of protrusions.

16. The fixing module of claim 15, wherein the locking member further comprises a slanted surface formed at an inner surface of the locking member adjacent to an end of the locking member, the slanted surface is located between the pair of locking holes, and a diameter of the through hole adjacent to the second assembling portion is larger than a diameter of the through hole away from the second assembling portion.

* * * * *